No. 707,505. Patented Aug. 19, 1902.
L. L. ELDEN.
ELECTRICAL SWITCH.
(Application filed Apr. 15, 1901.)
(No Model.) 2 Sheets—Sheet 1.
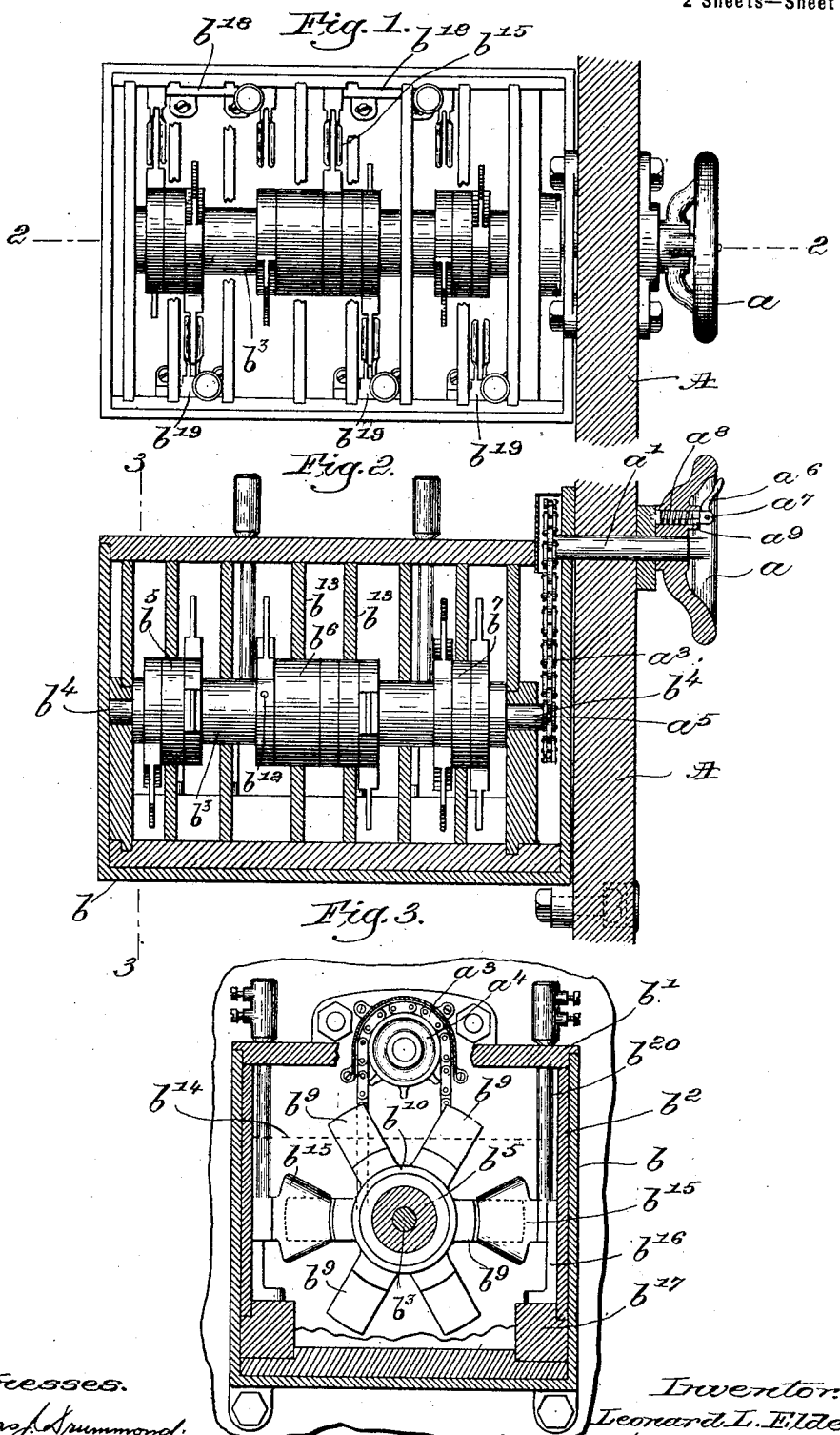

No. 707,505. Patented Aug. 19, 1902.
L. L. ELDEN.
ELECTRICAL SWITCH.
(Application filed Apr. 15, 1901.)
(No Model.) 2 Sheets—Sheet 2.
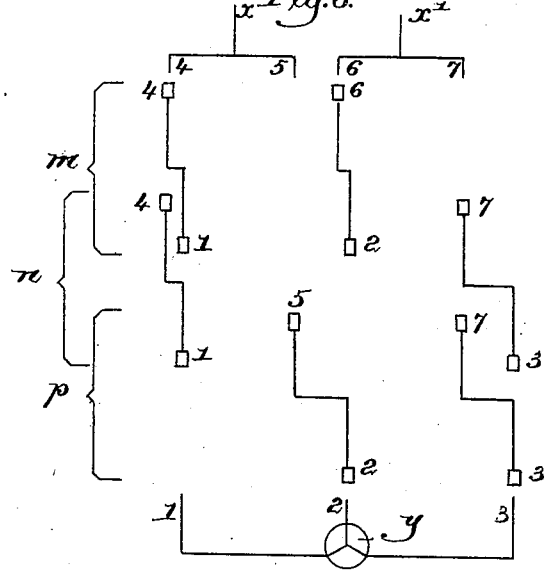
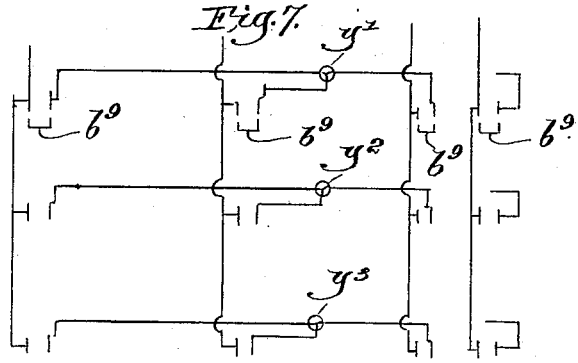
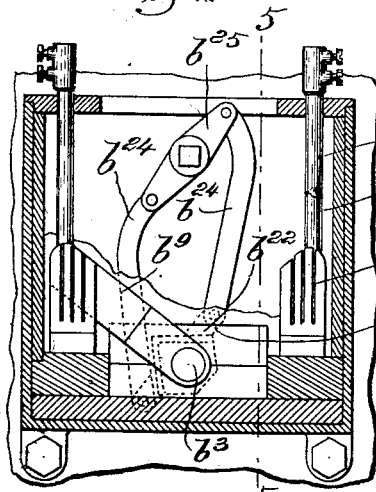
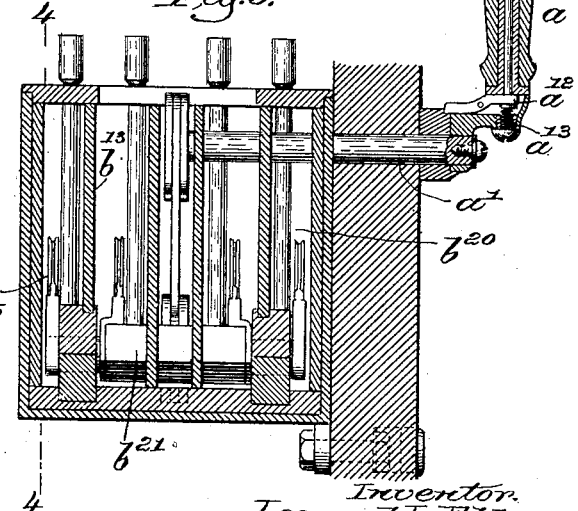
Witnesses.
Thomas Drummond.
Adolph Kaiser.
Inventor.
Leonard L. Elden,
by Crosby & Gregory
Attys.

UNITED STATES PATENT OFFICE.

LEONARD L. ELDEN, OF BOSTON, MASSACHUSETTS, ASSIGNOR OF ONE-HALF TO SEARS B. CONDIT, JR., OF SOMERVILLE, MASSACHUSETTS.

ELECTRICAL SWITCH.

SPECIFICATION forming part of Letters Patent No. 707,505, dated August 19, 1902.

Application filed April 15, 1901. Serial No. 55,845. (No model.)

*To all whom it may concern:*

Be it known that I, LEONARD L. ELDEN, a citizen of the United States, residing at Boston, county of Suffolk, State of Massachusetts, have invented an Improvement in Electrical Switches, of which the following description, in connection with the accompanying drawings, is a specification, like characters on the drawings representing like parts.

It is the object of my invention to provide an electric switch, simple in operation and construction, whereby a circuit may be directly transferred from one phase to another phase of a polyphase system or from one generator to another generator or from one source of supply to another, as the case may be, according to the situation in which the switch may be used.

I do not mean to restrict my invention to the particular uses mentioned, but use these for illustration merely. For example, taking a three-phase system, it has heretofore been customary to employ two switches for transferring the line-circuit or single-phase feeder to any one phase of the system, and several movements of the switches have been necessary in order to make the various combinations, whereas according to my invention a single switch suffices, and the feeder-circuit or service-line can be instantly transferred to any one of the three phases of the system by a single movement of the switch, and, moreover, can accomplish this with only one break or interruption of the service.

As herein shown, I employ a rotary contact-maker mounted in an oil-containing box provided on opposite sides with contacts, all arranged so as to provide the changes above referred to, and also to have a break between every two makes of the circuit, so that in a switch for three phases there would be six positions, one for each phase and a position of interruption between the same, provided the complete cycle of rotation were availed of.

In the drawings, in which I have shown a preferred embodiment of my invention, Figure 1 is a top plan view thereof, partly in section, and parts being broken away for clearness of illustration. Fig. 2 is a central longitudinal section thereof, taken on the line 2 2, Fig. 1. Fig. 3 is a vertical transverse section taken on the line 3 3, Fig. 2. Figs. 4 and 5 are sectional views of a modified form, taken, respectively, on the lines 4 4, Fig. 5, and 5 5, Fig. 4. Figs. 6 and 7 are diagrammatic views illustrating the manner in which the contacts and circuits may be arranged for certain applications of my invention.

Before explaining the wide range of application and the advantages in use of my invention I will describe the mechanical construction of the particular embodiments thereof which are herein shown.

The switch is shown as mounted on a usual switchboard A, having an operating member or handle $a$, secured to an operating-shaft $a'$ on one side of the switchboard, the said shaft extending to the other side of the switchboard in position to operate the switch proper. When used at a distance, the switch is operated by a motor.

In a box or other receptacle $b$ of any suitable size and shape, and preferably provided with a cover $b'$ and having an insulating-lining $b^2$, is mounted a rotary shaft $b^3$, of nonconductive material, and by the term "rotary" I mean to include a rock-shaft or any part which turns, whether through a whole revolution or not, this shaft being shown as journaled at $b^4$ in the opposite ends of the box and provided with a series of hubs, of conducting material, there being shown in Figs. 1 to 3 three of these hubs $b^5$ $b^6$ $b^7$, because this switch illustrates the application of my invention to a three-phase system. On these hubs are mounted a series of contact-makers $b^9$, which for convenience of adjustment for different systems and for convenience of construction and repair are carried by rings $b^{10}$, which may be adjusted on the hubs to any position required and secured by any suitable means, as by a screw $b^{12}$. Thus any one projection or contact-maker of one ring forms with some similar projection or contact-maker of some other ring on the same hub a pair of contact-makers connected by the conductive material of the hub and out of circumferential alinement with each other in position for simultaneously making or breaking contact, as the case may be, with the coöperating contacts $b^{15}$ of the apparatus. Between the rings I erect insulator-barriers $b^{13}$, and in the box I provide an oil insulation extending preferably considerably above the shaft $b^3$, as indicated by dotted line $b^{14}$, Fig. 3, so that the operating of the switch takes place entirely in oil.

The contacts $b^{15}$, which coöperate with the contact-makers $b^9$, are shown as carried by brackets $b^{16}$, adjustably secured on ledges $b^{17}$ at the sides of the box or receptacle $b$, and, as shown in Figs. 1 to 3, these contacts are connected together in pairs on one side by brackets or securing devices $b^{18}$, of conductive material, and on the other side they stand alone, as indicated at $b^{19}$. From each bracket extends upwardly a binding-post $b^{20}$, there being three binding-posts on one side, which receive the three wires from the three-phase generator, this being the system which we are using in this case for purposes of illustration, and on the opposite side of the switch there are two binding-posts for the two wires, respectively, of the feeder-circuit or service-line.

The operating-shaft $a'$ is located entirely above the oil insulation, so that there can be no possible leakage, the connection being herein shown as provided by a sprocket-chain $a^3$, passing over sprocket-wheels $a^4 a^5$.

In Figs. 4 and 5 I have shown the shaft $b^3$ as provided with angular hubs $b^{21}$, on which are mounted the contact-makers $b^9$ at $b^{22}$, and each contact $b^{15}$ has its own binding-post $b^{20}$, there being shown four of the latter on each side of the box. The shaft $b^3$ instead of freely rotating through a complete cycle simply rocks back and forth, being provided for this purpose with ears $b^{23}$, to which are pivoted opposite links $b^{24}$, pivoted at their upper ends to a cross-arm $b^{25}$, rigidly mounted on the inner end of the operating-shaft $a'$. In each instance the operating-handle $a$ is preferably provided with a thumb-operated detent for locking the same in the various positions, said detent being in the form of a thumb member to be depressed for raising a click device from engagement with a notch or hole, said apparatus in Figs. 1 and 2 comprising a lever $a^6$, pivoted at $a^7$ to the outer end of a plunger $a^8$, normally held inwardly by a spring $a^9$, and in Fig. 5 said device comprises a plunger $a^{10}$, reciprocating in the handle and engaging a dog $a^{12}$ at its inner end, normally held in locking engagement by a spring $a^{13}$.

Referring now more particularly to the diagrammatic figures, I will explain more at length the operation and advantages of my invention. Let it be supposed that in Fig. 6, 1 2 3 indicate, respectively, the three supply conductors or wires from a three-phase generator $y$, said three wires leading to the three binding-posts on the near side of Fig. 1, and that $x x'$ indicate the two wires composing the service-circuit leading to the two binding-posts at the farther side of Fig. 1. Each terminal $x x'$ leads to two contacts 4 5 and 6 7, respectively, and the contact-makers are arranged on the shaft or cylinder of the switch, as indicated, so that when the shaft is in one position (indicated at $m$) the circuit will be made through the contacts at 4 and 6 and 1 and 2, and thereby the feeder-circuit $x x'$ will get its supply from wires 1 and 2 of the generator, whereas when the switch is turned to the position $n$ the feeder-circuit will get its supply from wires 1 and 3 and when in the position $p$ from the wires 2 and 3. Thus, it will be understood, by simply rotating the shaft $b^3$ one way or the other one hundred and twenty degrees the line-circuit will be switched from the wires of one phase to another, as the case may be, through all the combinations thereof, and, moreover, this will be accomplished without passing through any other phase—$i. e.$, the service is transferred from any one phase to either of the others with only one interruption, and between each of these three circuit-making positions there is an intermediate circuit-breaking position, in which the circuit is entirely broken. Thus for a three-phase system the switch would have six positions and for a two-phase system four positions; for a six-phase system twelve positions, &c.

It will be observed that the line-circuit terminals are connected with two contacts in order that they may make the required combinations with the three contacts of the generator, or, in other words, in carrying out this form of my invention each of the circuit-terminals will connect independently with as many contacts less one as there are in the set of contacts for the interrelated supply-conductors or separate wires from the polyphase generator.

In practice I provide a quick-movement device in connection with the operating-handle, so as to insure that the make-and-break movements of the switch shall take place instantaneously; but as this forms no part of my present invention I have omitted the same and also various other details from the drawings, confining the latter to the features which go to make up my invention.

Besides the advantages which I have already explained it has been one object of my invention to provide a device capable of indefinite extension without in any way complicating the apparatus. This object is readily accomplished in my present apparatus simply by extending the shaft $b^3$ and putting on any number of contact-maker rings desired, according to the system or situation with which or in which the switch is to be used, the other parts of the switch being extended correspondingly. For instance, in Fig. 7 I have illustrated diagrammatically the form of my apparatus for switching from one generator system to another, there being indicated three generators $y' y^2 y^3$, which may be three-phase, as indicated, or two-phase, (four-pole,) as indicated by the additional set of contacts at the right-hand end of Fig. 7, or more, being capable of extension indefinitely, and also one switch may be provided with contacts and contact-makers for any number of generators, there being herein shown a three-throw switch simply for convenience of illustration. In this case the shaft $b^3$ will be provided with contact-makers $b^9$, arranged in longitudinal series and corresponding in number to the wires from the generator, and the contacts in the switch-box will coöperate therewith, one contact for each generator-wire and one contact for each transmission-wire, as is clearly indicated in Fig. 7, so that by a simple rotation of the switch from one position to the next the transmission-wires will be switched from one generator to the next by a single movement of the switch and without any complications or special knowledge or skill.

One great advantage of my invention is that it prevents the liability of mistakes and consequent disaster which has heretofore been the case where the operator has had to move several levers and understand a more or less elaborate system of connections in order properly to accomplish the switching, which is accomplished by my switch simply by one movement of one lever or handle.

From the above description it will doubtless be clear that when wired as shown in Fig. 7 the switch may be a double-throw, three-throw, or may have any number of throws for a machine having two poles, four poles, or more—as, for example, if used for single-phase machines simply the two sets of series of contacts shown at the left of Fig. 7 would be used, or if used for three-phase machines three sets would be used, if used with two-phase machines the entire four sets shown in Fig. 7 would be used, and so on.

The form of apparatus which I have described is intended for use among other situations with currents of an enormous volume, and therefore for this purpose and also to render the switch safe under all situations and practically indestructible I have provided the barriers $b^{13}$ and oil insulation, the latter making it impossible for destructive sparking or for short-circuiting to take place and the barriers preventing any accidental discharge from one contact to another, due to the expulsion of the oil by the explosion of gases sometimes generated at the contacts when the apparatus is used with very heavy currents.

I have not undertaken to set forth herein all the applications to which my invention may be applied, and it will be readily understood by those skilled in the art that the range is practically limitless simply by extending the length of the apparatus and correspondingly changing the wiring and contacts; nor do I limit myself to the form and arrangement of the parts as herein shown and described, as many modifications, substitutions, and changes may be resorted to without departing from the spirit and scope of my invention.

Having described my invention, what I claim as new, and desire to secure by Letters Patent, is—

1. In an electric switch, contacts for a line-circuit, independent contacts for a polyphase system, a single rotary hand-lever, and means for transferring the line-circuit by a single straight-ahead movement of the hand-lever from any one phase of the polyphase system to any other thereof.

2. An electric switch, having a plurality of contact-makers in a successive series for transferring a circuit from one source of supply to another, and a series of contacts coöperating therewith, said contact-makers being movable in an unvarying path only, into successive contact with said series of contacts, said switch having a break position between every two make positions.

3. An electric switch, having contacts for a service-circuit, and other contacts for a plurality of interrelated supply-conductors, a single hand-lever, and means for transferring by a single simple and unchangeable movement of the hand-lever said service-circuit from any two of said supply-conductors to any other two thereof.

4. An electric switch, having a rotatable shaft, provided with a series of contact-makers connected in pairs out of longitudinal alinement, coöperating contacts arranged in different circumferential positions to be simultaneously engaged by the contact-makers of a given pair and to be successively engaged by the contact-makers of successive pairs, as the shaft is rotated, and means for rotating said shaft.

5. An electrical apparatus, comprising a rotatable shaft, contact-makers carried thereby and connected by conductive material in pairs out of circumferential alinement with each other, contacts in position to be simultaneously engaged by the respective contact-makers of a given pair, and operating means for rotating said shaft.

6. An electrical apparatus, comprising a rotatable shaft, contact-makers adjustably carried thereby out of circumferential alinement with each other and connected in pairs by conductive material, contacts in position to be simultaneously engaged by the respective contact-makers of a given pair, and operating means for rotating the shaft.

7. An electrical apparatus, comprising a rotatable shaft, contact-makers carried thereon by rings adjustably mounted on the shaft, said contact-makers being out of circumferential alinement with each other and connected in pairs by conductive material, contacts in position to be simultaneously engaged by the respective contact-makers of a given pair, and means for rotating the shaft.

8. An apparatus containing make-and-break devices, including a rotatable shaft having contact-makers, and contacts mounted in position to be engaged by said contact-makers, one set of contacts being connected to the terminals of a service-circuit, and another set of contacts being connected to interrelated supply-conductors, as, for example, the wires from a polyphase generator, each of said service-circuit terminals having separate connection to contacts in its set one less in number than the number of supply-conductors in the said opposite set of contacts with which it coöperates.

In testimony whereof I have signed my name to this specification in the presence of two subscribing witnesses.

LEONARD L. ELDEN.

Witnesses:
 GEO. H. MAXWELL,
 SEARS B. CONDIT, Jr.